US009517935B2

(12) United States Patent
Abry et al.

(10) Patent No.: US 9,517,935 B2
(45) **Date of Patent: *Dec. 13, 2016**

(54) METHOD OF GENERATING MICRONIZED SULPHUR

(71) Applicant: CCR Technologies, Ltd., Calgary (CA)

(72) Inventors: Raymond G. F. Abry, Calgary (CA); Todd Beasley, Calgary (CA); Richard Lyle Johnson, Vegreville (CA); Richard Eugene Kuzub, Sherwood Park (CA); Jin Kwon Tak, Edmonton (CA)

(73) Assignee: CCR Technologies, Ltd., Calgary, Alberta (CA)

( * ) Notice: Subject to any disclaimer, the term of this patent is extended or adjusted under 35 U.S.C. 154(b) by 410 days.

This patent is subject to a terminal disclaimer.

(21) Appl. No.: 13/854,436

(22) Filed: Apr. 1, 2013

(65) Prior Publication Data

US 2013/0230448 A1 Sep. 5, 2013

Related U.S. Application Data

(63) Continuation of application No. 12/373,572, filed as application No. PCT/IB2007/004161 on Aug. 10, 2007, now Pat. No. 8,431,106.

(60) Provisional application No. 60/836,849, filed on Aug. 10, 2006.

(51) Int. Cl.
*C01B 17/02* (2006.01)
*C01B 17/10* (2006.01)

(52) U.S. Cl.
CPC .......... *C01B 17/0237* (2013.01); *C01B 17/10* (2013.01); *C01P 2004/61* (2013.01)

(58) Field of Classification Search
None
See application file for complete search history.

(56) References Cited

U.S. PATENT DOCUMENTS

| | | | | |
|---|---|---|---|---|
| 3,224,677 | A * | 12/1965 | Schmidt et al. | 239/101 |
| 4,321,079 | A * | 3/1982 | Ott | 71/61 |
| 4,778,007 | A * | 10/1988 | Van Laar | 166/369 |
| 2006/0043002 | A1* | 3/2006 | Petrinec et al. | 208/208 R |

* cited by examiner

*Primary Examiner* — Melvin C Mayes
*Assistant Examiner* — Sheng H Davis
(74) *Attorney, Agent, or Firm* — Bushman Werner, P.C.

(57) ABSTRACT

A method of producing micronized sulphur wherein elemental sulphur is dissolved in a solvent for sulphur to produce a sulphur-solvent solution and precipitation of the dissolved sulphur is effected or controlled by manipulation of at least one of pressure, temperature or water content in the solvent to produce the micronized sulphur.

10 Claims, No Drawings

METHOD OF GENERATING MICRONIZED SULPHUR

CROSS REFERENCE TO RELATED APPLICATION

This application is a continuation of U.S. application Ser. No. 12/373,572, filed on Feb. 25, 2010, now U.S. Pat. No. 8,431,106, which is a U.S. National of PCT/IB2007/004161, filed Aug. 10, 2007, which claims priority to U.S. Provisional Application 60/836,849, filed on Aug. 10, 2006, the disclosures of which are incorporated herein by reference for all purposes.

BACKGROUND OF THE INVENTION

Field of the Invention

The present invention relates to a method of generating elemental sulphur fines, i.e., micronized sulphur.

Description of Prior Art

Economic and safe generation of fine sulphur particles has challenged the industry for numerous years. Current methods used include physical grinding (ball milling) of solid sulphur or spraying fine molten sulphur particles into water. These processes pose disadvantages which include but are not limited to safety, consistency of product and capital and operating expenses. It is therefore advantageous to have an improved method for the manufacturing of fine (micronized) sulphur particles that are generated in a safe, economical and predictable manner.

It is well known that anhydrous ammonia can solubilize elemental sulphur. In 1911, Ruff and Hecht, first described the solubilization of sulphur in liquid NH3. See "Uber das Sulfammonium and seine Beziehungen zum Schwefelstickstoff", Z. anorg. Chem. Bd 70. Also, see U.S. Pat. No. 4,824,656 ('656 Patent); U.S. Patent Application Publication 2006/00443002; Proceedings of the 2nd International Symposium on Phosphogypsum held in Miami, Fla., Dec. 10-12, 1986 p 143; and WO 2004/109714.

SUMMARY OF THE INVENTION

In one aspect, according to the present invention, micronized sulphur, e.g., elemental sulphur having an average particle size of less than 9,999 μm to sub-colloidal, preferably less than 25 μm to sub-colloidal, is produced by controlling the precipitation of elemental sulphur dissolved in an a suitable sulphur solvent, e.g., anhydrous ammonia. According to this aspect, precipitation of the micronized sulphur can occur by controlling the temperature i.e. raising or lowering the temperature of the sulphur solution as required.

In another aspect of the present invention, the micronized sulphur can be obtained by a "blow-down process" in which a pressurized solution of sulphur in a sulphur solvent is reduced, resulting in vaporization of the solvent with a concomitant release of the solvent as a gas and production of micronized sulphur. This blow-down procedure can be considered a precipitation of the dissolved elemental sulphur and the resulting formation of micronized sulphur.

In one respect the present invention provides a method of producing micronized sulphur comprising dissolving elemental sulphur in a solvent for sulphur to produce a sulphur-solvent solution and controlling precipitation of the dissolved sulphur in the sulphur-solvent solution by manipulating one of pressure, temperature or water content to produce micronized sulphur.

DETAILED DESCRIPTION OF PREFERRED EMBODIMENTS

As used here, "anhydrous ammonia" refers to ammonia having less than about 0.3 wt % by water while "hydrous ammonia" refers to ammonia containing from about 0.3 up to about 70 wt. % water, preferably from about 0.3 up to about 10 wt. % water.

As part of the method of the present invention, it is necessary to dissolve elemental sulphur in a sulphur solvent, i.e., a solvent which dissolves sulphur to form a true solution. Thus, it will be recognized that the liquid medium containing the dissolved sulphur can comprise a first liquid, (sulphur solvent), e.g., liquid ammonia, which dissolves sulphur and a second liquid, e.g., water, in which the sulphur is substantially insoluble. Although preferred solvents are anhydrous and hydrous ammonia as described above, other solvents may include liquid sulphur dioxide, liquid or super critical carbon dioxide, carbon disulphide, dimethyldisulfide, etc., including blends of various solvents as described above including blends with water.

The sulphur employed to form the sulphur solutions can include solid elemental sulphur, e.g., sulphur blocks, prills, slated sulphur, sulphur pad bottoms containing impurities such as dirt, or liquid sulphur, e.g., elemental sulphur above its melting point. For example, such a liquid sulphur source can comprise the outlet stream of a Claus Sulphur Degassing System or melted sulphur block material.

When dissolving molten sulphur in a sulphur-solvent, it may be desirable to pass the molten sulphur through a perforated plate/sieve tray such that the molten sulphur is introduced into the ammonia as droplets/prills, etc. By controlling the diameter of the perforations in a perforated plate, the rate of dissolution of the molten sulphur into the liquid ammonia as well as its cooling rate can be controlled.

According to one aspect of the present invention blow-down is used, e.g., pressure reduction of a sulphur/solvent solution through an orifice, fixed or variable, to vaporize the solvent effectively leaving precipitated micronized sulphur. Parameters such as solvent, temperature and pressure of the sulphur/solvent solution, rate of release through the orifice, and size of the orifice, can be varied to optimize the micronized sulphur produced according to the end needs. Thus, for example, a solvent/sulphur solution and a smaller orifice may likely produce micronized sulphur having a different average particle size than if a larger orifice was employed.

In another aspect of the invention where micronized sulphur is produced by precipitation of the micronized sulphur from a solvent/sulphur solution by changing temperature, there are a number of variables which can be optimized to produce micronized sulphur of a desired size for a desired end use. Thus, as noted above, by varying the solvent as well as the temperature at which precipitation is conduced, the average particle size of the micronized sulphur produced can be tailored. It should be noted that just as the type of solvent employed can affect the average particle size of the micronized sulphur produced via precipitation from a liquid medium, the type of solvent employed can also influence the average particle size of the micronized sulphur produced via the blow-down or vaporization method.

In general, the method of producing the micronized sulphur, be it blow-down or precipitation, can be affected by the following non-limiting parameters which can affect the average particle size of the micronized sulphur produced:

the amount of water present in the sulphur solution, when water is present naturally or added in specific concentrations;

orifice size when blow-down is employed depending on sulphur solvent composition.

Whatever method is employed, according to the present invention, micronized sulphur with an average particle size of less than about 9,999 μm to sub-colloidal range, preferably less than 1,000 μm to sub-colloidal range, more preferably less than 100 μm to sub-colloidal range, and still more preferably less than 25 μm to sub-colloidal range. Especially preferred is micronized sulphur of less than 10 μm to sub-colloidal range.

It has been found according to the present invention that using a blow-down or vaporization method when the elemental sulphur is dissolved in liquid ammonia plus up to 10 wt. % water (hydrous ammonia), the particle size of the micronized sulphur is not markedly affected by the size of the orifice opening. Thus, over a range of orifice sizes from ¼ inch to 25 gauge (0.02 inches), the mean partial size is basically unaffected. This is a surprising result since it was believed that precipitation of micronized sulphur from anhydrous ammonia would yield more consistent particle size and range of size than using hydrous ammonia.

It has been found that when using anhydrous ammonia, it is possible to dissolve up to approximately 28 wt. % elemental sulphur (w/w). The solubility of elemental sulphur in hydrous ammonia varies depending upon the mass ratio between water and liquid ammonia. In this respect, reference is made to Table 1 below which shows the solubility of elemental sulphur in various water/ammonia solvents.

TABLE 1

| Solvent Mass Ratio ($Water/NH_3$) | Solubility of S ° at 24.6° C. (%, w/w) |
|---|---|
| 0.0000 | 27.80 |
| 0.0472 | 14.37 |
| 0.0971 | 9.45 |
| 0.2495 | 2.70 |
| 0.4880 | 0.79 |
| 0.9696 | 0.27 |

Note:
Solubility = Mass of S °/Mass of Solvent

As can be seen from Table 1 and as expected, the solubility of elemental sulphur in anhydrous ammonia decreases as hydrous ammonia is created with increasing water content. In general, the amount of sulphur present in the sulphur solvent will be the maximum that can be achieved while still maintaining a true solution. Thus, the sulphur can be present up to the point of saturation level in the solvent provided the conditions of such saturated solution maintain the sulphur in a true solution. As seen in Table 1, when hydrous ammonia is employed, the amount of elemental sulphur that can be dissolved varies directly with the ammonia content of the hydrous ammonia.

With respect to the production of micronized sulphur according to the present invention by precipitation, as noted in the paper above by Ruff & Hecht, the solubility of sulphur in anhydrous ammonia is inversely proportional to temperature. This can be seen Table 2 below.

TABLE 2

| Data From Ruff & Hecht, 1911 | | | | | | | |
|---|---|---|---|---|---|---|---|
| | | Raw Data Set | | | | Summary of Data | |
| Temperature Deg C. | g S per 100 g Sol'n | Grams of Sulphur | Grams of NH3 | Grams of Solution | wt. frc. of S in Sol'n | Temperature Deg C. | g S per 100 g Sol'n |
| −20.50 | 38.10% | 0.3824 | 0.6217 | 1.0041 | 0.380839 | −20.50 | 38.05% |
| | | 0.1661 | 0.2708 | 0.4369 | 0.380179 | 0.00 | 32.27% |
| Calculated | 38.05% | | | | 0.380509 | 16.40 | 25.65% |
| | | | | | | 30.00 | 20.98% |
| 0.00 | 32.34% | 0.5736 | 1.2427 | 1.8163 | 0.315807 | 40.00 | 18.50% |
| | | 0.4646 | 0.9446 | 1.4092 | 0.329691 | | |
| Calculated | 32.27% | | | | 0.322749 | | |
| 16.40 | 25.65% | 0.3549 | 1.0289 | 1.3838 | 0.256468 | | |
| Calculated | 25.65% | | | | 0.256468 | | |
| 30.00 | 21.00% | 0.1837 | 0.7163 | 0.9000 | 0.204111 | | |
| | | 0.2817 | 1.0251 | 1.3068 | 0.215565 | | |
| Calculated | 20.98% | | | | 0.209838 | | |
| 40.00 | 18.50% | 0.2294 | 1.0107 | 1.2401 | 0.184985 | | |
| Calculated | 18.50% | | | | 0.184985 | | |

Accordingly, in the precipitation from solution by varying temperature method of the present invention, a solution of sulphur and the suitable solvent, e.g., anhydrous ammonia, would be prepared with the desired sulphur content, the latter being achieved by temperature control of the solvent. Thus, by way of example only, sulphur could be dissolved in anhydrous ammonia or hydrous ammonia at a temperature of 5° C. and the temperature raised in desired increments, e.g., 10° C. up to a desired higher temperature, e.g., 35° C. The sulphur precipitating at each of the temperature intervals could be evaluated for particle size properties.

In cases where the relationship between sulphur solubility in a given solvent is directly proportional to temperature as opposed to being inversely proportional, as is the case with anhydrous ammonia as the sulphur solvent, it will be appreciated that precipitation of the sulphur from the solution would result from decreasing the temperature of the solution which again could be done in increments to obtain micronized sulphur having desired particle size properties. Thus it could be readily determined for a given end use which temperature produced micronized sulphur of the desired average particle size as well as particle size distribution. Once again it will be understood that depending upon the solvent employed, the average particle size and particle size distribution of the micronized sulphur produced could be varied. Thus, and by way of example only, micronized sulphur dissolved in solvent A and precipitated at temperature T might produce micronized sulphur of a different particle size than that produced by a solution in solvent B at the same temperature. As well, the water content of the solvent could also affect the particle size characteristics of the micronized sulphur.

Both in the case of the blow-down or vaporization method and in the precipitation by changing temperature method, additives could be employed to tailor the surface properties of the micronized sulphur being produced. Additionally, physical treatments, e.g., ultrasonics, could be employed to tailor the properties of the micronized sulphur. In a modified blow-down method of the present invention, the sulphur solution rather than just the solvent could be released through a nozzle having an orifice of the desired size and into a cooled, low pressure region which would allow for a nearly instantaneous termination of particle growth thereby minimizing particle size and narrowing the distribution as well as enhancing product recovery. Other techniques to control nucleation and particle growth, whether used in either of the blow-down methods or the precipitation method, can be applied to the method of the present invention.

The pressure under which the sulphur-solvent solution is kept will of course vary with the particular solvent and the temperature. In general, the pressure on the sulphur-solvent solution will be such that the sulphur-solvent is maintained in a liquid form at least prior to any blow-down and/or solvent precipitation.

To more fully demonstrate the present invention, the following non-limiting examples are presented.

Example 1

A solution of hydrous ammonia and sulphur containing 10 wt. % water and 9.5 wt. % sulphur in a pressurized vessel at a pressure of 118 psi and a temperature of 21° C. was processed by separating the hydrous ammonia from the sulphur by releasing the pressure of the solution, causing the volatilization (off-gassing) of the hydrous ammonia and the deposition (precipitation) of the elemental sulphur. Fine sulphur was deposited on the inside walls of the vessel. The micronized sulphur had a mean particle size of 17.98 μm and a particle size range of 8.23 μm to 52.86 μm by volume.

Example 2

The procedure of Example I was followed for a solution of anhydrous ammonia and sulphur containing 27 wt. % sulphur in a pressurized container at a pressure of 125 psi and a temperature of 21° C. The ammonia-sulphur solution was processed by separating the anhydrous ammonia from the sulphur by releasing the pressure of the solution, causing the volatilization (off-gassing) of the anhydrous ammonia and the deposition of the elemental sulphur. The micronized sulphur produced had a mean particle size of 20.60 μm and a particle size range of 7.24 μm to 71.5 μm by volume.

Example 3

In this example, prilled (2 mm diameter) elemental sulphur was dissolved in one of two liquids:

(i) liquid anhydrous ammonia, or (ii) liquid 10 wt. % water-ammonia mixture.

The solvents were saturated with sulphur at room temperature (21° C.) in a pressurized vessel at a pressure of 125 psig which was sufficient to keep the anhydrous and hydrous ammonia as a liquid prior to releasing the pressure. After the elemental sulphur had dissolved in the solvent, newly formed particles of sulphur were formed by releasing the pressure used to maintain the ammonia in a liquid state. In other words, elemental, micronized sulphur precipitated as the ammonia was removed. The ammonia vapor stream containing the dissolved elemental sulphur was directed through various sized nozzles in the form of needles of various gauge as well as a quarter inch tube. All of the needles and the ¼" tube were immersed in approximately 170 ml of distilled water. It was found that the newly formed, micronized sulphur particles stayed suspended in the water as the ammonia evaporated. The resulting particle size distribution of the micronized sulphur was measured by laser diffraction. Table 3 below shows the correlation between needle gauge and diameter in both inches and millimeters.

TABLE 3

| Gauge | Diameter (in) | Diameter (mm) |
|---|---|---|
| 1 | 0.375 | 9.530 |
| 14 | 0.083 | 2.108 |
| 16 | 0.065 | 1.651 |
| 18 | 0.049 | 1.245 |
| 20 | 0.035 | 0.889 |
| 25 | 0.02 | 0.508 |

Table 4 below shows the micronized sulphur particles produced as a function of solvent treatment and orifice (needle or tube size).

TABLE 4

Table 2. Sulphur particle size as a function of solvent treatment and needle size.

| Solvent Treatment | Needle Size (gauge) | Particle Size[1] (μm) Mean (D [0.5]) | <10% (D [0.1]) | <90% (D [0.9]) |
|---|---|---|---|---|
| Anhydrous Ammonia | ¼" | 0.29 | 0.7 | 36.20 |
| | ¼" | 0.31 | 0.77 | 15.20 |
| | ¼" | 0.32 | 0.84 | 16.20 |
| | Average | 0.31 | 0.77 | 22.53 |
| | 14 | 0.15 | 0.23 | 0.33 |
| | 14 | 0.18 | 0.24 | 0.31 |
| | Average | 0.17 | 0.24 | 0.32 |
| | 20 | 0.27 | 0.36 | 9.30 |
| | 20 | 0.32 | 0.71. | 39.40 |
| | 20 | 0.32 | 0.56 | 35.20 |
| | Average | 0.26 | 0.52 | 17.50 |
| | 25 | 0.18 | 0.24 | 0.31 |
| | 25 | 0.18 | 0.24 | 0.32 |
| | Average | 0.18 | 0.24 | 0.32 |
| Liquid Ammonia + 10% water | ¼" | 0.26 | 0.46 | 0.78 |
| | 14 | 0.23 | 0.34 | 0.49 |
| | 16 | 0.25 | 0.35 | 0.49 |
| | 18 | 0.24 | 0.33 | 0.45 |
| | 20 | 0.24 | 0.34 | 0.46 |
| | 23 | 0.24 | 0.33 | 0.44 |
| | 25 | 0.24 | 0.34 | 0.46 |

[1]Based on log-normal expression of cumulative particle size where geometric mean is (D [0.5] and D [0.1] and D [0.9] represent points in rgw cumulative distribution where 10% and 90% are less than the indicated size, respectively.

As can be seen from the results in Table 4, in the case of anhydrous ammonia as a solvent, the mean particle size (D[0.5]) and smallest particle size (D[0.1]) are apparently unaffected by needle gauge. However, as can be seen, substituting 14 or 25 gauge needles for the quarter inch tube leads to a narrow range of sulphur particle sizes as is evidenced by the small average particle size reported for those gauges in the column labeled (D[0.9]). On the other hand, one quarter inch tubing and 20 gauge needles resulted in wide particle size ranges.

With respect to the use of the hydrous ammonia, i.e., ammonia plus 10 wt. % water, it can be seen that the particles generated were smaller (geometric mean) and the distribution was narrower as compared to the use of anhydrous ammonia. Thus, the size of the orifice or opening whether it be ¼" tubing or 14 to 25 gauge needles did not influence the final mean particle size nor did it greatly influence the range of particle sizes.

As the above data demonstrates, the elemental sulphur can be dissolved in hydrous or anhydrous ammonia and when the sulphur solution is injected into water, the ammonia evaporates and sulphur particles are left suspended in the water. As can be further seen, the micronized sulphur particles that remain suspended in the water following ammonia evaporation, in general, have particle sizes less than 1 to several μm in diameter.

As further can be seen, the use of anhydrous ammonia as opposed to hydrous ammonia, in general, produces micronized sulphur which has a larger particle size. Lastly, as can be seen, when elemental sulphur is dissolved in hydrous ammonia, the micronized sulphur particle size and range of sizes is not affected by the size of the orifice opening, i.e., from ¼" to 25 gauge.

As described above in the blow-down method, and as shown by the examples, the pressurized sulphur-solvent solution can simply be vented to an atmospheric environment, e.g., a plenum or the like, where the gaseous ammonia can be captured to minimize any environmental problems caused by ammonia release or it can be injected into a liquid, e.g., water, which is not a solvent for the micronized sulphur and recovered from the liquid.

The foregoing description and examples illustrate selected embodiments of the present invention. In light thereof, variations and modifications will be suggested to one skilled in the art, all of which are in the spirit and purview of this invention.

What is claimed is:

1. A method of producing micronized sulphur comprising:
dissolving elemental sulphur in a solvent for sulphur to produce a sulphur-solvent solution, said solvent being selected from the group consisting of anhydrous ammonia, hydrous ammonia, liquid sulphur dioxide, liquid carbon dioxide, supercritical carbon dioxide, carbon disulphide, dimethyldisulphide and mixtures thereof;
controlling precipitation of said dissolved sulphur in said sulphur-solvent solution by manipulation of at least one of pressure, temperature or water content to produce micronized sulphur; and
recovering micronized sulphur.

2. The method of claim 1, wherein said control of precipitation comprises adjusting the temperature of said sulphur-solvent solution.

3. The method of claim 1, wherein said solvent comprises anhydrous ammonia containing less than 0.3 wt. % water.

4. The method of claim 1, wherein said solvent comprises hydrous ammonia containing from 0.3 to 70 wt. % water.

5. The method of claim 4, wherein said solvent comprises hydrous ammonia containing from 0.3 to 10 wt. % water.

6. The method of claim 1, wherein said solvent is one wherein the solubility of said elemental sulphur is directly proportional to temperature.

7. The method of claim 1, wherein said solvent is one wherein the solubility of said elemental sulphur is inversely proportional to temperature.

8. The method of claim 1, wherein said micronized sulphur has an average particle size of less than 1000 μm.

9. The method of claim 1, wherein said sulphur is present in said solvent in an amount up to saturation under conditions which maintain said sulphur in solution until precipitation of said micronized sulphur.

10. A method of producing micronized sulfur comprising:
dissolving elemental sulfur in a solvent selected from the group consisting of aqueous solutions of sulfur dissolving substances, liquid sulfur dioxide, liquid carbon dioxide, supercritical carbon dioxide, anhydrous ammonia and mixtures thereof to produce a sulfur-solvent solution;
controlling precipitation of said dissolved sulfur in said sulfur-solvent solution by manipulation of at least one of pressure, temperature or water content to produce micronized sulfur; and
recovering micronized sulfur having an average particle size of less than 1000 μm.

* * * * *